Nov. 4, 1941.      R. C. NEWHOUSE      2,261,272
RADIANT ENERGY DISTANCE MEASURING SYSTEM
Filed Aug. 7, 1940
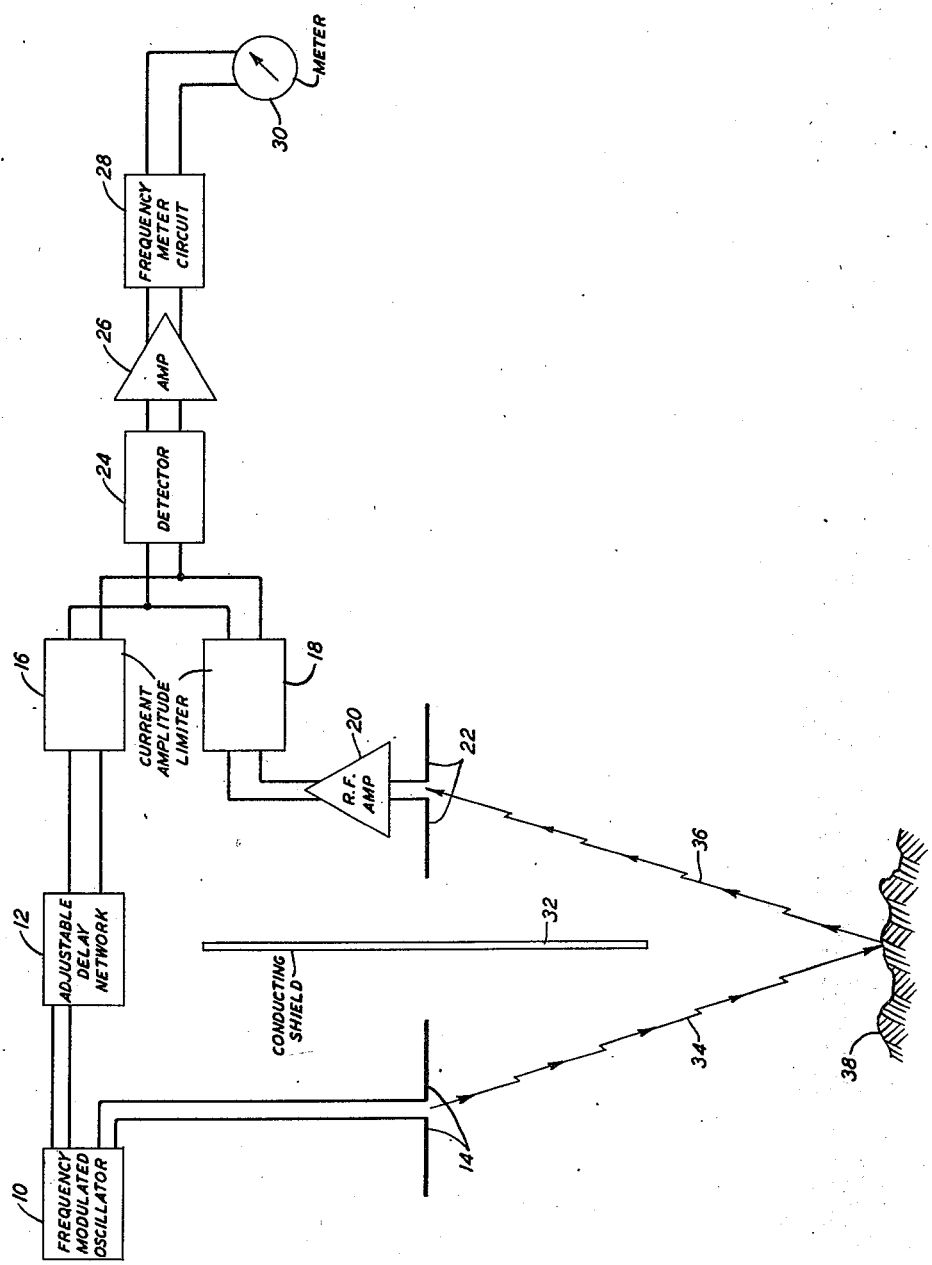
INVENTOR
R. C. NEWHOUSE
BY H. O. Wright
ATTORNEY Patented Nov. 4, 1941

2,261,272

UNITED STATES PATENT OFFICE 2,261,272

RADIANT ENERGY DISTANCE MEASURING SYSTEM

Russell C. Newhouse, Millburn, N. J., assignor to Bell Telephone Laboratories, Incorporated, New York, N. Y., a corporation of New York Application August 7, 1940, Serial No. 351,759

12 Claims. (Cl. 250—1)

This invention relates to improved radiant energy distance measuring methods and systems. More particularly, it relates to improved methods and systems for measuring distance by means of frequency modulated waves. The methods and systems of the invention are particularly well adapted for the determination on rapidly moving craft of the distance to adjacent irregular surfaces as, for example, the distance from a rapidly moving aircraft to the surface of the earth.

The methods and systems of this invention represent an improvement over the methods and systems of the type exemplified by my copending application Serial No. 240,739, filed November 16, 1938, and by Patents 2,045,071 and 2,045,072, both issued June 23, 1936 to L. Espenschied. A general discussion of such systems and the problems involved in proportioning the parameters thereof for operation over particular ranges of altitude are given in a paper entitled "A Terrain Clearance Indicator" by Lloyd Espenschied and applicant, published in the Bell System Technical Journal volume XVIII, pages 222 to 234, inclusive, for January 1938.

Objects of the invention are to eliminate difficulties encountered with distance measuring systems of the prior art employing frequency modulated waves, to extend the operative range of such systems and to permit the use of simpler amplification control for such systems.

In accordance with the methods of the prior art systems, a portion of the transmitted wave energy comparable in magnitude with the received reflections of the wave from the surfaces whose distances are to be determined, is permitted to reach the receiving antennas of the systems directly, where it, perforce, is immediately combined with the received reflected portions of the wave to obtain beat-notes the frequencies of which are proportional to the distances of the surfaces from which the reflections of the wave are received.

In accordance with the methods of this invention substantially none of the transmitted wave energy is permitted to reach the receiving antennas of the systems directly, so that the energy received on the latter antennas consists, for all practical purposes, solely of reflected energy.

The reflected energy may, therefore, be separately amplified and amplitude modulation thereof resulting from terrain modulation, i. e., from variations in character and distance of the reflecting surfaces and by the combined effect of several reflections received simultaneously from surfaces at different distances, from non-uniform frequency response characteristics of transmitting and receiving antennas and circuits and from miscellaneous other causes classed generally as noise, can be substantially eliminated (or "wiped" off) by passing the amplified reflected energy through a current amplitude limiting device before the reflected energy is combined with energy derived by a more direct metallic path from the transmitter.

Furthermore, the energy derived through a direct metallic path from the transmitter can be passed through an adjustable delay network to definitely adjust its phase for such purposes as compensating for the physical spacing between transmitting and receiving antennas or to change the effective scale of the indicator and it can also be passed through a current amplitude limiting device to remove amplitude modulation resulting from non-uniform frequency response of the transmitter circuits and from noise therein.

In systems of the present invention, therefore, when the energy directly derived from the transmitter is combined in the detector with the reflected energy to obtain beat-note frequencies indicative of the distances to the reflecting surfaces, both of the waves so combined are substantially pure frequency modulated waves and "clean" beat-note frequencies, unaccompanied by "terrain modulation products" and other disturbing frequencies resulting from unwanted amplitude modulations of either of the waves being combined, or from "noise," are obtained.

Further objects of the invention will become apparent during the course of the following description and in the appended claims.

A preferred embodiment of the invention, illustrative of the application of the principles thereof, is shown in the sole figure of the accompanying drawing.

In more detail, in the sole figure of the drawing, frequency modulated oscillator 10 supplies radio frequency energy doublet antenna 14, causing it to radiate a wave a portion of which, 34, strikes reflecting surface 38 so as to be reflected as wave 36 to receiving antenna 22. A conductive shield 32, which on aircraft may be the fuselage of the craft, is interposed between antennas 14 and 22 to prevent direct transmission of energy therebetween. Energy received on antenna 22 is amplified in radio frequency amplifier 20. The output of amplifier 20 is passed through current amplitude limiter 18 which removes all amplitude modulations, such as terrain modulation, amplitude modulation resulting from non-uniform frequency response characteristics of the transmitting and receiving apparatus through which the received reflected energy has passed, and noise. The output of limiter 18 is combined in detector 24 with energy derived from oscillator 10 through the circuit including adjustable delay network 12, and current amplitude limiter 16 to produce a beat-note frequency, the frequency of which is an index of the distance to the reflecting surface 38. The beat-note is amplified in amplifier 26, the output of which is furnished to pulse counting frequency meter circuit 28 the output of which latter circuit is connected to meter 30. For the majority of practicable systems it will be found convenient to employ a frequency range of beat-notes within the limits of 60 cycles per second and 100,000 cycles per second. Amplifier 26 should, of course, have a substantially flat amplification characteristic over the entire frequency range of beat-notes employed in the particular system with which it is used.

The parameters of the above system can, for example, be substantially the same as for the illustrative system described in the above-mentioned paper in the Bell System Technical Journal for altitudes between 0 and 5,000 feet.

By simply adjusting the delay network 12 to retard the arrival of the directly derived energy at detector 24 by a desired predetermined time interval, an additional range, covered by a like variation in beat-note frequencies, can obviously be provided without the necessity of changing any other parameters of the system. Of course, an additional scale suitably calibrated to show distance over the additional range should preferably be added to the meter so that distance readings can more conveniently be made. It is evident that a large number of additional ranges can be provided by this simple expedient as may be desired under any given set of circumstances.

Numerous applications of the principles of the invention, clearly within the spirit and scope thereof, will occur to those skilled in the art. No attempt has here been made to exhaustively expound such applications. The scope of the invention is defined in the following claims.

What is claimed is:
1. The method of measuring the distance from an aircraft to an adjacent surface which comprises generating a frequency modulated wave, radiating from said craft toward said surface the frequency modulated radio wave, selectively receiving on said craft only the reflections of said wave from said surface, amplifying said received reflected wave and limiting the current amplitude of said received reflected wave to remove amplitude modulations thereof, deriving energy directly from the generating source of the radiated wave, limiting the current amplitude of said derived energy wave to remove amplitude modulations thereof, combining the said two limited waves and detecting the beat-note frequency therebetween and measuring the frequency of the beat-note to obtain an indication of the distance.

2. In a radio altimeter of the type which includes means for transmitting a frequency modulated wave to strike the earth's surface; means for receiving only reflections of said wave, means for amplifying said received reflected waves, means for limiting the current amplitude of said waves, means for deriving energy directly from the transmitting means and limiting the current amplitude of the directly derived energy, means for combining the amplified and limited received reflected waves with the limited directly derived energy and detecting the combined waves to obtain a beat-note and means for measuring the frequency of the beat-note to obtain an indication of distance.

3. A radiant energy distance measuring system of the type employing frequency modulated waves, including a first means for emitting from a first point a frequency modulated radio wave, a second means at said first point for receiving reflections of said wave from a distant object, a third means at said first point for preventing the direct reception of energy from said first means by said second means, means for amplifying the reflected waves received by said second means and means for limiting the current amplitude of the amplified reflected waves whereby the disturbing effects of unwanted amplitude modulations of said received reflected waves are eliminated.

4. The combination of claim 3 and a fourth means at said first point for deriving energy directly from the said first means comprising a metallic circuit which includes a current amplitude limiter for removing unwanted amplitude modulation from the directly derived energy and a fifth means at said first point for combining and detecting the amplified reflected and limited waves and the directly derived limited waves to obtain a beat-note the frequency of which is indicative of the distance from the first point to the reflecting object.

5. The method of claim 1 and the additional step of delaying the energy directly derived from the generating source to provide an additional range of distance indications.

6. The altimeter of claim 2 and means for delaying the energy directly derived from the transmitting means.

7. The method of measuring the distance from a rapidly moving object to an adjacent surface which comprises generating on said object a frequency modulated wave, radiating said wave from said object, receiving on said object reflections of said wave from said surface, limiting the amplitude of said received reflected frequency modulated waves to an extent sufficient to remove amplitude modulations thereof, combining the limited received reflected waves with the frequency modulated waves instantly being generated, detecting the combined waves to obtain a beat-note and determining the frequency of said beat-note to provide a measure of the distance to the adjacent surface.

8. In an altimeter system for high-speed aircraft, said system being of the type which employs a frequency modulated wave and combines reflections of said wave from the earth's surface with the wave being instantly generated to obtain a beat-note the frequency of which is indicative of the altitude; the method of minimizing the disturbing effects of terrain modulation and other fortuitous and unwanted amplitude modulation of the reflected wave which comprises amplitude limiting the received reflected wave sufficiently to substantially remove amplitude modulations thereof prior to combining it with the wave instantly being generated.

9. The method of claim 8 with the additional step of amplitude limiting that portion of the wave being instantly generated which is to be combined with the reflected portion of the wave sufficiently to substantially remove amplitude modulations from said portion of said instantly generated wave prior to combining the instantly generated and reflected portions of the wave.

10. In an altimeter system for high-speed aircraft, said system being of the type which includes on an aircraft a generator of frequency modulated ultra-high frequency waves, an antenna, connected with said generator, for radiating said waves to strike the surface of the earth, an antenna for receiving reflections of said waves from the surface of the earth, a circuit, connected with said generator and said receiving antenna, wherein the reflected waves and the instantly generated waves are combined and detected to obtain a beat-note, a frequency measuring circuit, connected with the first mentioned circuit which provides a voltage proportional to the beat-note frequency obtained and an indicating meter, connected with the second circuit and responding to the voltage produced in said frequency measuring circuit to indicate altitude; a current amplitude limiter electrically connected in the altimeter circuit between the receiving antenna and the circuit in which the waves are combined and detected, said current amplitude limiter being adjusted to substantially remove amplitude modulations from the received reflected waves.

11. The arrangement of claim 10 and a second current amplitude limiter electrically connected in the altimeter circuit between the generator of frequency modulated, ultra-high frequency waves and the circuit in which these waves are combined with the received reflected waves, said second current amplitude limiter being adjusted to substantially remove amplitude modulations from the instantly generated waves.

12. The arrangement of claim 10 and a delay network electrically connected in the altimeter circuit between the generator of frequency modulated, ultra-high frequency waves and the circuit in which these waves are combined with the received reflected waves, whereby the range of altitudes conveniently measured by said arrangement is changed.

RUSSELL C. NEWHOUSE.